United States Patent [19]
Powell

[11] 3,733,847
[45] May 22, 1973

[54] DIRECT CONTACT HALOCARBON FREEZANT APPARATUS

[75] Inventor: Harold R. Powell, King of Prussia, Pa.

[73] Assignee: Pennwalt Corporation, Philadelphia, Pa.

[22] Filed: Mar. 24, 1971

[21] Appl. No.: 127,620

[52] U.S. Cl..................................62/375, 62/54
[51] Int. Cl.................................F25d 17/02
[58] Field of Search..............62/63, 64, 375, 376, 62/380, 54

[56] References Cited

UNITED STATES PATENTS

| | | | |
|---|---|---|---|
| 3,605,429 | 9/1971 | Smith et al. | 62/64 |
| 3,486,345 | 12/1969 | Waldin | 62/63 |
| 3,228,206 | 1/1966 | Lockerby | 62/375 X |
| 3,398,788 | 8/1968 | Brunson | 62/380 X |
| 2,928,254 | 3/1960 | Rae | 62/54 |
| 3,150,495 | 9/1964 | Reed | 62/54 |

Primary Examiner—Meyer Perlin
Assistant Examiner—Ronald C. Capossela
Attorney—Stanley Bilker

[57] ABSTRACT

Direct contact halocarbon freezant system employs a chamber whose article inlet and outlet are open to atmosphere and includes blower for drawing air through both while gases and vapors are discharged through a pair of condenser arrays at top of chamber. Articles are subjected to direct contact with freezant in chamber and halocarbon loss minimized since secondary condenser temperature determines partial pressure of freezant vapor and accordingly the relative freezant-to-air volume.

8 Claims, 2 Drawing Figures

INVENTOR
HAROLD R. POWELL

BY Stanley Bilker

ATTORNEY

DIRECT CONTACT HALOCARBON FREEZANT APPARATUS

This invention relates to a method and apparatus for freezing articles, such as food, by subjecting them to direct contact with a liquid halocarbon freezant in an open chamber. More particularly, this invention concerns an immersion or spray freezing system utilizing chlorinated or fluorinated alkane freezants, for example refrigerant-11, -12 and/or -22, in which freezant losses are minimized.

Direct contact immersion and spray freezing systems are well known in the art and have been employed in the freezing of food for many years. The use of halocarbon freezants for this purpose has become popular in recent years because these chlorinated and/or fluorinated alkane liquid refrigerants are non-toxic, chemically inert, non-flammable and are recoverable by condensation at reasonable temperatures. However, their relatively high initial cost necessitates that substantial loss of these freezants does not occur during the freezing process. Freezant loss may be occasioned by vaporization of the refrigerant material during abstraction of heat from the articles during contact followed by permeation to atmosphere. In addition, it is possible for the freezant to be coupled directly to the articles by way of formation of hydrate crystals thereon.

In the past, vapor locks have been used to introduce the articles into and withdraw them from a housing or chamber within which the freezant was contained for spray or immersion contact. Still another system utilized a chamber whose article entrance and exit passages were open to the atmosphere, and the mode of control involved the maintenance of a non-condensible gas-freezant vapor interface below the level of all paths to the atmosphere. The first mentioned interlock system was costly and did not permit completely uninterrupted article conveyance into and out of the freezing treatment chamber. The second system effected significant losses both to the atmosphere and in hydrated attachment of the freezant to the product.

It is therefore an object of this invention to provide a method and apparatus for freezing articles by direct contact with halogenated halocarbon refrigerants with minimal loss of freezant.

Another object of this invention is to provide a method and apparatus for direct contact freezing of articles with halocarbon freezants in which entrance to and egress from the freezing chamber is accomplished without interlocks.

Yet another object of this invention is to provide an apparatus for halocarbon-contact freezing of articles without a vacuum chamber and without incurring hydrate formation on the surface of the articles.

Yet still another object of this invention is to provide an apparatus for freezing of food and other articles by immersion in or spray contact with halocarbon freezants in which substantially all freezant vapor is returned to the freezing chamber.

Other objects of this invention are to provide an improved device and method of the character described which is easily and economically produced, which is sturdy in construction, and which is both highly efficient and effective in operation.

With the above and related objects in view, this invention consists of the details of construction and combination of parts as will be more fully understood from the following detailed description when read in conjunction with the accompanying drawings in which.

Figure 1:
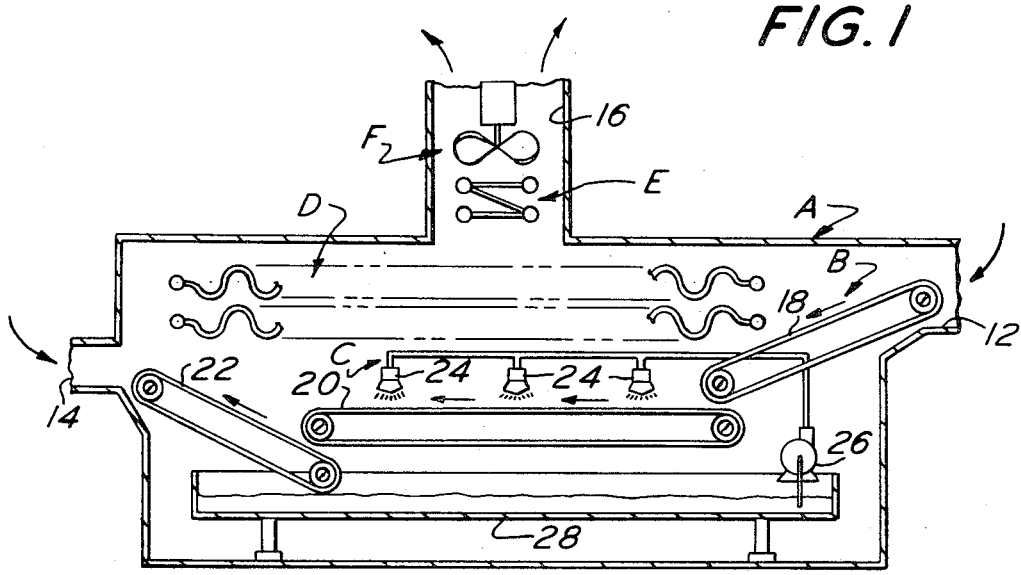
FIG. 1 is an elevational sectioned view of a halocarbon freezant spray contact freezing apparatus embodying this invention.

Referring now in greater detail to the drawings in which similar reference characters refer to similar parts, there is shown a direct contact halocarbon freezing apparatus comprising an open-ended elongated housing, generally designated as A, a conveyor B for carrying articles through the housing, means, generally designated as C, for contacting the articles with freezant, a first or primary condenser D located within the housing, a secondary condenser E mounted within an exhaust conduit of the housing, and a blower F for drawing air from the article inlets and outlets of the housing and through the condensers.

The housing A is generally elongated in configuration to permit suitable exposure of the articles to the freezant material. The walls are insulated and an open inlet 12 permits introduction of the articles to be frozen while an open outlet 14 allows them to be extracted without any interlocks. A conduit 16 is situated at the upper portion of the housing A and is preferably centrally located therein midway between the inlet and outlet.

The conveyors B are substantially conventional and, as illustrated in FIG. 1, include an endless belt 18 for carrying the articles through the inlet 12 and depositing them on a second endless belt 20. The terminal end of the central belt conveyor 20 empties the articles upon an endless belt 22 which discharges the frozen articles through the outlet 14.

The halocarbon contacting system C in FIG. 1 constitutes a series of spray nozzles 24 which are located directly above the central belt 20. A pump 26 forces the freezant through the spray nozzles 24 after drawing the liquid from a refrigerated trough 28 which is supported below the belt 20. Of course, the trough 28 collects the freezant spilled over from the articles as well as condensed halocarbon vapor from the condensers D and E.

The liquid halocarbon, typically refrigerant 12 (dichloro difluoro methane) at a temperature of approximately $-20°$ F. is circulated by the pump 26 and impinged upon the products to be frozen by way of the spray nozzles 24. Other halocarbon refrigerants can also be employed, for example refrigerant 22 (dichloro monofluoro methane) or refrigerant-11 (trichloro monofluoro methane). Abstraction of heat from the product during the freezing process causes large quantities of halocarbon vapor to be evolved as the liquid halocarbon gives up its latent heat to the food. Most of this halocarbon vapor rises within the freezing housing and is condensed on the coils or plates of the primary condenser D. Suitable provision is made (not shown in FIG. 1) for the condensed cold halocarbon to flow back to the tank or trough 28. The primary condenser D is commonly furnished with a secondary refrigerant at a temperature lower than the equivalent saturation temperature of the halocarbon at atmospheric pressure. For refrigerant 12, the main condenser coils D are maintained at $-40°$ F. to $-45°$ F. By bringing the warm product to be frozen in at a level higher than the vertical level of the condenser coils and removing the cold frozen product at a point higher than the level of the coils, carry-over of halocarbon refrigerant from the housing interior to the outside is minimized. However, since the housing A is open at each end and does contain additional leakage openings, the blower F in duct 16 effects a negative air pressure within the housing. The blower F has sufficient capacity to insure that the air at all times flows inwardly through the openings into the freezer chamber.

Accordingly, the housing interior is maintained at a slightly lower pressure than atmospheric pressure. The flow of air is thereby inwardly both through the inlet 12 where the product enters and through the outlet 14 where the product exits. By maintaining this intentional flow of air inwardly, corresponding outward flow of halocarbon vapor is prevented at these zones.

The secondary condenser coil E is located directly in front of the flow stream to the fan F in the duct 16. The purpose of the secondary coil E is to insure that any halocarbon refrigerant which is entrained in the exhaust air stream is exposed to the temperature of the secondary coils, the condenser E being retained at a substantially lower temperature, $-60°$ F. for example, than the primary condenser temperature.

The operation of the secondary recovery system, which includes the blower F and the secondary condenser E is as follows: A constant flow of air would enter through the openings of the housing A, including the inlet 12 and the outlet 14, and move toward the secondary condenser E. This air flow would, because of the natural inefficiencies of the primary or main condenser D, contain a certain amount of vaporized halocarbon. Assuming that each 100 cubic feet per minute of air flow contains as much as 10 cubic feet per minute of halocarbon vapor, the ratio of air to halocarbon would be 10 to 1. As this flow approaches the area of the secondary condensers E, the air would travel in an intricate pattern through the condensers to assure contact with the coils thereof prior to leaving the system. Therefore, the total flow of vapor and air would be likely at some point contact the secondary condenser E, and, in so contacting the condenser, the temperature of the vapor air stream would be reduced to a temperature very close to that of the coil — i.e., $-60°$ F. At $-60°$ F., the vapor pressure of refrigerant 12 is reduced to a pressure of 5.35 p.s.i. absolute. Therefore, assuming the worst possible case for halocarbon loss, the vapor stream leaving the freezer A would contain halocarbon refrigerant 12 at a pressure of approximately 5.35 P.S.I.A. (nominally 5 p.s.i.). Since the total pressure of the fan/freezer system is essentially 14.7 p.s.i. (nominally 15 P.S.I.A.), the partial pressure of the air would be 10 P.S.I.A. (15 minus 5). The relative volumes of air and halocarbon vapor leaving the chamber would be proportional to the partial pressures of the components. Therefore, for a ratio of air/vapor pressures equal to 10 P.S.I.A. to 5 P.S.I.A., the relative volumes would be in the ratio of 2:1. Accordingly, if 100 c.f.m. of air-vapor mixture were leaving the freezer, there would be 66 c.f.m. of air at $-60°$ F. and 33 c.f.m. of refrigerant 12 at $-60°$ F. The system is adjusted so that the minimum fan speed is employed, and this is accomplished experimentally to keep the total loss of halocarbon to a minimum. It is assumed that the minimum fan speed is that which will preclude vapor dissipation through the food entrance and outlet ports 12 and 14.

In the event that the secondary condenser E is operated at a temperature of $-80°$ F., the vapor pressure of the halocarbon refrigerant 12 would be reduced to 2.88 P.S.I.A., nominally 3 P.S.I.A. Therefore, out of a total pressure of 15 P.S.I.A., the air pressure would be 12 P.S.I.A. (15−3). Accordingly, at $-80°$ F., the ratio of air by refrigerant 12 escaping from the conduit 16 would be in the ratio of 12:3 or 4:1. Thus, it is easily seen that there is a direct relationship between the temperature of the secondary condenser E and the volume of refrigerant escaping from the vent. As the temperature of the secondary condenser is lowered, the amount of refrigerant escaping through the vent conduit is correspondingly lowered.

Figure 2:
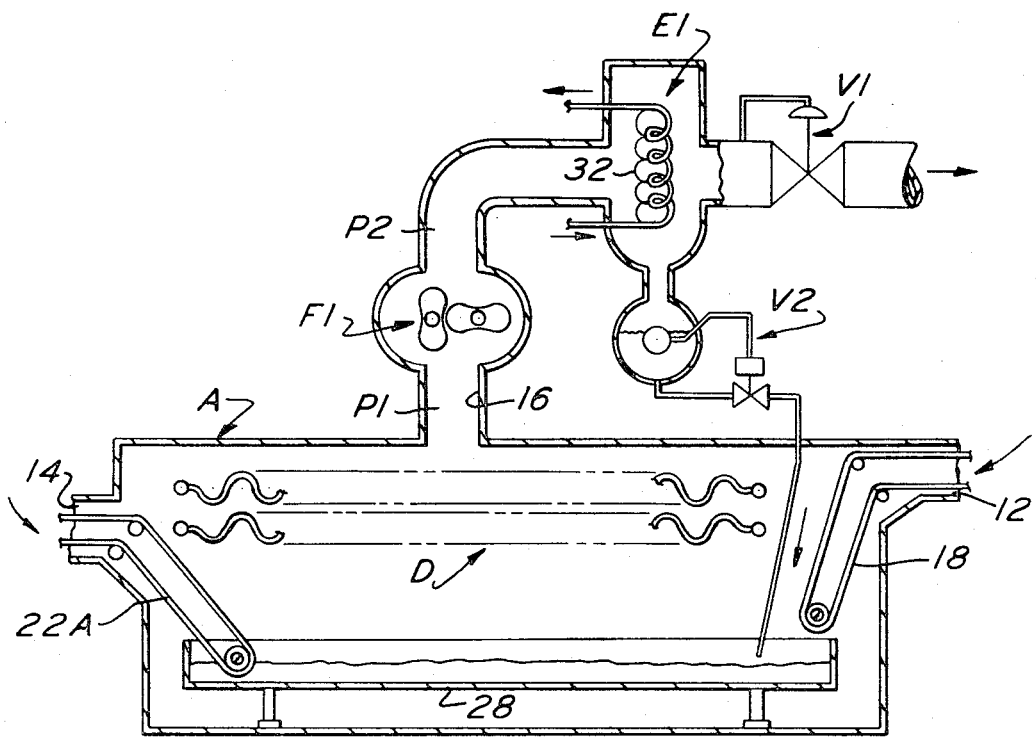
FIG. 2 is an elevational sectioned view of a modification of the direct contact freezant apparatus shown in FIG. 1.

In FIG. 2, there is shown another embodiment of this invention in which a compressor F1 is used alone or in addition to the blower F. The compressor compresses the total amount of exit gas at a compression ratio for example of 10:1. At such a 10:1 compression ratio, the pressure at P1 would be substantially at atmosphere or 15 p.s.i. However, at P2 there would be a pressure after compression approximately 150 P.S.I.A. A direct acting pressure control valve V1 senses the pressure at the secondary condenser E1 and permits gas discharge to the atmosphere only when the pressure within condenser chamber 30 exceeds 150 P.S.I.A. A secondary compressor 32 which is physically located within the secondary condenser coils E1, the latter being operated at $-60°$ F., for example. Since the condenser E1 is operating at $-60°$ F., the vapor pressure of the halocarbon refrigerant 12 would be approximately 5 P.S.I.A. whereas the total gas pressure would be 150 P.S.I.A. Condensed refrigerant from coil E1 would fall to the bottom of the condenser chamber 30 and allowed to drain back to the tank 28 by way of float control valve V2. However, since the vapor pressure of the refrigerant 12 in chamber 30 is 5 P.S.I.A. whereas the total gas pressure in this chamber is 150 P.S.I.A., the air pressure is 145 P.S.I.A. (150 minus 5). Therefore, the air to refrigerant pressure ratio in the discharge mixture would be 145 to 5 or 29:1. Accordingly, the volume of halocarbon vapor discharge to air discharge would be at most 1 part in 29.

If the condenser E1 were further reduced to $-80°$ F., the air to refrigerant vapor ratio at 150 P.S.I.A., could be increased to better than 33:1. At a 100 c.f.m. intake, the loss of refrigerant 12 would thereby be in the order of 3 c.f.m. at the inlet. As is apparent, the freezer could be controlled to reduce loss of refrigerant 12 to very low values while achieving economical operation.

In the FIG. 2 embodiment, the conveyor 18 drops the articles directly into the bath of refrigerant in the tank 28. Since the specific gravity of the halocarbon refrigerants is normally much greater than the food products, the food will float. Currents can carry the product across the bath or a chain flight conveyor (not shown) in the tank can draw the materials over to a bucket conveyor 22A which extracts the frozen product out of the freezer.

Although this invention has been described in considerable detail, such description is intended as being illustrative rather than limiting, since the invention may be variously embodied, and the scope of the invention is to be determined as claimed.

What is claimed is:

1. A direct contact liquid freezing apparatus comprising a. a chamber having an inlet and an outlet open to the atmosphere,
b. conveying means for introducing articles through the inlet into the chamber and thence drawing the articles from the chamber through the outlet,
c. means for exposing the articles within the chamber to direct contact with a halocarbon freezant refrigerated within an open vessel to a temperature below 0° C.,
d. a first condenser supported in said chamber at a level not exceeding the inlet and outlet levels and operative at a temperature at least below the boiling point of the halocarbon freezant so that the freezant manifests a lowered vapor pressure,
e. a conduit disposed in the upper portion of said chamber above said first condenser and in communication with atmosphere,
f. a second condenser supported in said conduit and operative at a temperature substantially below that of said first condenser to further reduce the freezant vapor pressure,
g. blower means in said conduit for drawing air and freezant vapor within the chamber through said first and second condensers and discharging air with diminished concentration of vapor entrained therein through the conduit to a point outside the chamber while reducing chamber pressure below atmospheric, and
h. means for collecting halocarbon freezant vapor condensed on said first and second condensers and returning the condensed halocarbon freezant to the vessel.

2. The apparatus of claim 1 including means for returning halocarbon freezant in said means for collecting back to said chamber.

3. The apparatus of claim 1 wherein said means for exposing constitutes a plurality of spray nozzles.

4. The apparatus of claim 1 wherein said blower means comprises a compressor.

5. The apparatus of claim 4 including means constituting a pressure control valve interposed at the discharge end of said conduit and maintaining gas pressure within said conduit at a predetermined level.

6. The apparatus of claim 5 wherein gas within said conduit is vented to atmosphere when the pressure thereof exceeds the predetermined level.

7. The apparatus of claim 6 wherein said means for collecting constitutes a sump, and means for returning the condensed halocarbon freezant vapor to said chamber when the level of the condensed vapor exceeds a predetermined level.

8. The apparatus of claim 7 wherein said means for returning condensed halocarbon freezant vapor includes a float controlled valve.

* * * * *